US011206588B2

(12) United States Patent
Hassan et al.

(10) Patent No.: US 11,206,588 B2
(45) Date of Patent: Dec. 21, 2021

(54) NETWORK CONNECTION PLANNING USING CROWD-SOURCED DATA (71) Applicant: Microsoft Technology Licensing, LLC, Redmond, WA (US)

(72) Inventors: Amer Aref Hassan, Kirkland, WA (US); Hooman Shiranimehr, Sammamish, WA (US); Ronald F. Johnson, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 36 days.

(21) Appl. No.: 16/518,066

(22) Filed: Jul. 22, 2019

(65) Prior Publication Data
US 2021/0029599 A1 Jan. 28, 2021

(51) Int. Cl.
*H04W 4/06* (2009.01)
*H04W 36/00* (2009.01)
*H04W 64/00* (2009.01)
*H04W 72/00* (2009.01)
*H04W 72/04* (2009.01)

(52) U.S. Cl.
CPC ... *H04W 36/00837* (2018.08); *H04W 64/006* (2013.01); *H04W 72/005* (2013.01); *H04W 72/048* (2013.01)

(58) Field of Classification Search
None
See application file for complete search history.

(56) References Cited

U.S. PATENT DOCUMENTS

| 6,961,368 | B2 | 11/2005 | Dent et al. |
| 8,514,825 | B1 * | 8/2013 | Addepalli ............... H04L 45/12 370/338 |
| 8,644,225 | B2 | 2/2014 | Chen et al. |
| 8,706,131 | B2 | 4/2014 | Winters |
| 9,439,205 | B1 | 9/2016 | Lin et al. |
| 9,462,544 | B2 | 10/2016 | Jorguseki et al. |
| 9,510,251 | B2 | 11/2016 | Sidhu et al. |
| 9,565,609 | B2 | 2/2017 | Kuusilinna et al. |

(Continued)

FOREIGN PATENT DOCUMENTS

| EP | 2477421 A1 | 7/2012 |
| WO | 2013049060 | 4/2013 |
| WO | 2016106077 | 6/2016 |

OTHER PUBLICATIONS

"International Search Report and Written Opinion Issued in PCT Application No. PCT/US20/034604", dated Aug. 28, 2020, 10 Pages.

(Continued)

*Primary Examiner* — Willie J Daniel, Jr.
(74) *Attorney, Agent, or Firm* — Schwegman Lundberg & Woessner, P.A.

(57) ABSTRACT

Techniques for providing network connection plans for computing devices planning to travel along a pre-specified route are disclosed herein. In an example, crowd-sourced data is used to generate a network map that includes network parameters mapped to one or more geographical locations. The network map is used to generate a network connection plan for a computing device planning to travel along a pre-specified route. The computing device may then connect to one or more wireless networks according to the network connection plan while traveling along the pre-specified route.

20 Claims, 9 Drawing Sheets (56) References Cited

U.S. PATENT DOCUMENTS

| | | |
|---|---|---|
| 9,775,001 B2 | 9/2017 | Dunkin et al. |
| 2004/0017310 A1 | 1/2004 | Vargas-Hurlston et al. |
| 2013/0053054 A1 | 2/2013 | Lovitt et al. |
| 2014/0163849 A1 | 6/2014 | Adam et al. |
| 2014/0269618 A1 | 9/2014 | Surface et al. |
| 2015/0017985 A1 | 1/2015 | Safavi |
| 2015/0105116 A1 | 4/2015 | Schmidt et al. |
| 2015/0257059 A1 | 9/2015 | Hirudayaraj et al. |
| 2015/0281303 A1 | 10/2015 | Yousef et al. |
| 2015/0319660 A1 | 11/2015 | Helbert |
| 2016/0029279 A1 | 1/2016 | Bellamkonda et al. |
| 2017/0162057 A1 | 6/2017 | Ross et al. |
| 2017/0328725 A1 | 11/2017 | Schlesinger et al. |
| 2018/0023968 A1 | 1/2018 | Stuchfield et al. |

OTHER PUBLICATIONS

"Google Fi", [online], [retrieved on Nov. 28, 2018], Retrieved from the Internet: URL: https://web.archive.org/web/20181128222927/https://fi.google.com/about/faq/>, (Nov. 28, 2018), 6 Pages.

"IBM and Ericsson Announce Research Advance for 5G Computer Networks", (Feb. 7, 2017), 2 pgs.

"Google Wifi and Cloud Services", [online], [retrieved on Apr. 17, 2019], Retrieved from the Internet <URL: https://support.google.com/wifi/answer/6246642?>, (2019), 5 Pages.

\* cited by examiner

NETWORK CONNECTION PLANNING USING CROWD-SOURCED DATA

TECHNICAL FIELD

This document pertains generally, but not by way of limitation, to wireless networking, and particularly but not by way of limitation to planning network connections for computing devices travelling along planned routes.

BACKGROUND

Several applications exist for users to plan travel routes in order to minimize a total travel time between start and end locations. These applications may provide several alternative routes based on type of road, predicted vehicle traffic, construction, or other travel considerations. The user can then select a desired route and follow that route to travel between the start and the end locations. While travelling along a planned route, user devices and other computing devices may desire to access various types of data through various wireless networks. Network connectivity can vary greatly depending on geographical location. For some users, reliable network connectivity may be of utmost importance while travelling between the start and end locations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

A system and method are disclosed herein that utilize crowd-sourced network maps indicative of one or more network parameters for various geographic locations to generate network connection plans. Often times, users travelling from one location to another not only want to minimize travel time, but also desire reliable network service (voice, data, etc.). When travelling, users may connect to several networks via one or more channels of each network. One or more of those networks and/or channels may become unavailable, or may have low quality, providing a poor experience for a respective user. Additionally, channel and/or network handoffs can occur while travelling, which can cause temporary interruptions in service. Therefore, it is desirable to plan network access for a user travelling along a specified route to maximize network connection quality for the entirety of the route to provide a better experience for the user.

To provide users with improved network quality, a crowd-sourced network map may be used to generate a network connection plan for a computing device planning to travel along a route from a start location to an end location. In one example, the network plan may be generated for a computing device to minimize a number of network and/or channel handoffs for a user travelling along a planned route. The computing device may then use the network connection plan while travelling along the planned route to connect to one or more specified networks through one or more specified wireless channels. The network connection plan may be updated while the computing device is travelling along the planned route using an updated network map, or advertised connections from other computing devices traveling along similar routes.

Figure 1:
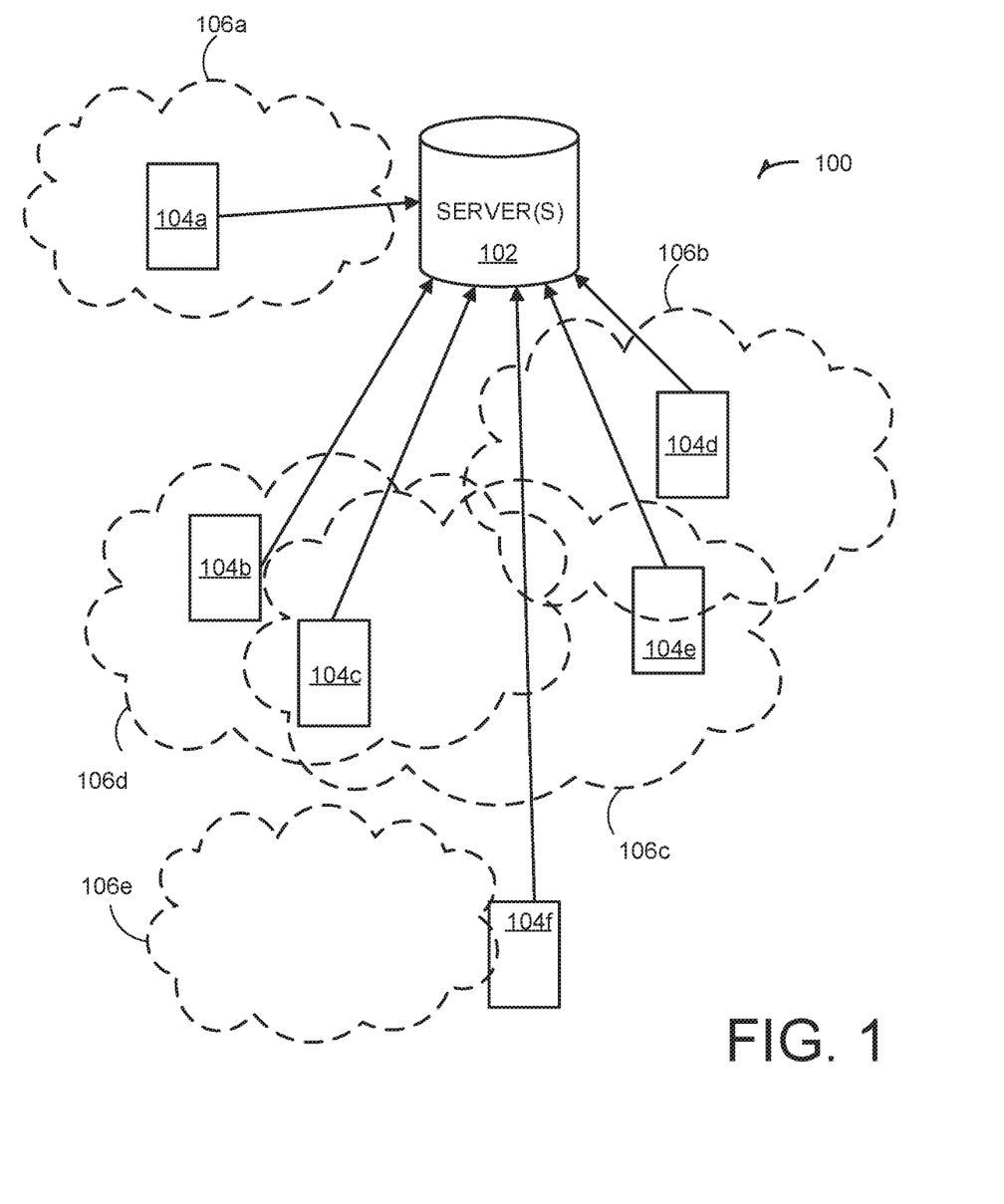
FIG. 1 is a diagram illustrating an example system for crowd-sourcing network connectivity data.

FIG. 1 is a diagram illustrating an example system 100 for crowd-sourcing network connectivity and quality data. The system 100 includes one or more servers 102 and user devices 104a-104f accessing one or more wireless networks 106a-106e. The user devices 104a-104f may be any user devices travelling along one or more geographical routes while accessing the one or more wireless networks 106a-106e. The wireless networks 106a-106e may be cellular networks, local area networks, wide area networks, or any other wireless networks. For example, the wireless networks 106a-106e may include one or more 3rd generation (3G), 4th generation (4G), long term evolution (LTE), 5th generation (5G) or any other cellular network, wireless networks according to the institute of Electrical and Electronics Engineers (IEEE) 802.11 family of standards known as Wi-Fi®, IEEE 802.16 family of standards known as WiMax®, IEEE 802.16.4 family or any other wireless network. Each of the wireless networks 106a-106e may be configured to communicate with one or more of the user devices 104a-104f on one or more network channels. The channels may be frequency channels, for example, defined by the wireless standard for which the respective network communicates. While illustrated as five wireless networks 106a-106e and six user devices 104a-104e, any number of user devices may provide data regarding any number of wireless networks.

The user devices 104a-104f may be configured to communicate with the servers 102 through any connection, including wired and wireless connections. Each user device 104a-104f, which may be a phone, tablet, laptop, wearable device or other personal computing device, may be configured to upload data to, and download data from, the servers 102. Each user device 104a-104f may upload to the servers 102 current location data along with data that includes one or more network parameters regarding one or more of the wireless networks 106a-106e. These network parameters can include, for example, network type, channel availability, channel quality, network availability, network download speeds, network upload speeds, voice availability, voice quality, and any other parameters or indicators for each respective network. The user devices 104a-104f may communicate the network parameters to the servers 102 through the respective networks 106a-106e for which the respective user device 104a-104f is reporting, or through another network. For example, a user device may report voice connection availability to the servers 102 over a data connection. The data may be uploaded to the servers 102 in real time, or may be stored by a respective user device 104a-104f and uploaded to the servers 102 at a later time.

The servers 102 may include one or more applications configured to collect the network quality data from the user devices 104a-104f and compile a "crowd-sourced" network map for one or more geographical areas. For example, the network quality data may be provided to the servers 102 along with current geographical information, such as latitude and longitude coordinates. The network map may be a model of the wireless networks 106a-106e stored in a database with geographical coordinates mapped to specific networks 106a-106e and respective network quality data. The data can be grouped into geographical areas of any size based on the coordinates, such as city blocks, sections of a highway, or any other specified geographical area.

Figure 2:
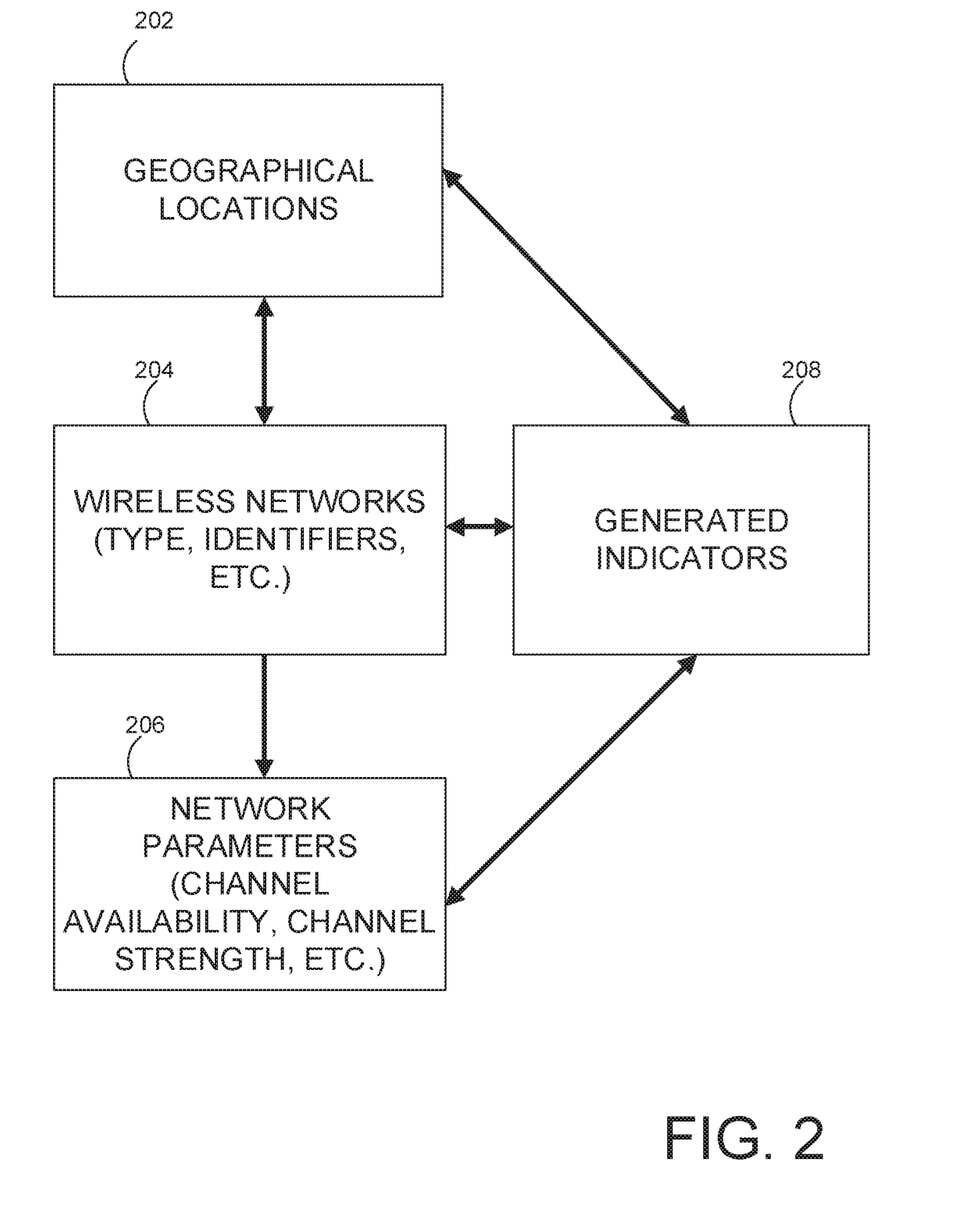
FIG. 2 is a logical diagram illustrating a network map generated using crowd-sourced network data.

FIG. 2 is a logical diagram illustrating a network map 200 generated using crowd-sourced network quality data. The network map may store and map geographic locations 202, networks 204, and network parameters 206, for example, to one another. In other examples, further crowd-sourced data may be stored related to one or more wireless networks. The geographic locations 202 can include coordinates (such as latitude and longitude), and/or geographic areas such as city blocks, parcels of land, portions of highway, or any other geographically defined area.

The geographic locations 202 may map to one or more networks 204. For example, if a network is available for a specific geographic location, the respective network can be mapped to that geographic location (and/or that geographic location can be mapped to that network). The networks 204 may include data such as network identifiers, network type, and any other data specific to a wireless network. Each wireless network of the networks 204 can also map to one or more network parameters. The parameters can include network availability, channel availability, channel stability, channel strength, and any other parameters or indicators regarding respective wireless networks.

The information for the network map 200 may be stored in one or more databases in any desirable format. The network map 200 may be generated by the servers 102 or any other computing system using the crowd-sourced data received from the user devices 104a-104f The network map may also generate and store indicators 208 generated by the servers 102 regarding the geographical locations 202, networks 204, and or parameters 206. In one example, the indicators 208 may include a list of all network outages for a respective wireless network 106a-106e for each geographical area. In another example, the indicators 208 may include a network quality indicator for each wireless network and/or channel for each geographical area. For example, for each channel of a network for each geographic area, the network map may include an indicator between 0 and 10, 0 for no connectivity and 10 for great connectivity. In another example, the indicators 208 may be a simple binary yes or no regarding whether or not a type of network is available for a respective geographical area. In some examples, the indicators may be generated using machine learning or any other algorithms.

The indicators 208 can also be generated to provide multiple indications for a respective network or channel. For example, each channel of a respective network can be assigned a score for each of various categories. In an example, the categories can include bandwidth, latency, throughput, jitter, error rate, and/or any other network performance categories. In an example, multiple user devices 104a-104e can provide data regarding a respective channel for a respective geographical area. The respective channel may then be scored using the data. These scores may then be used to inform connection choices by computing devices, for example. In an example, for users desiring to use Voice over Internet Protocol (VoIP) it may be desirable to know which channels have low latency, whereas for users streaming data, it may be desirable to know which channels have high bandwidth. Therefore, these indicators 208 may be used by one or more applications to plan network connections for computing devices traveling through the geographical locations 202.

Figure 3:
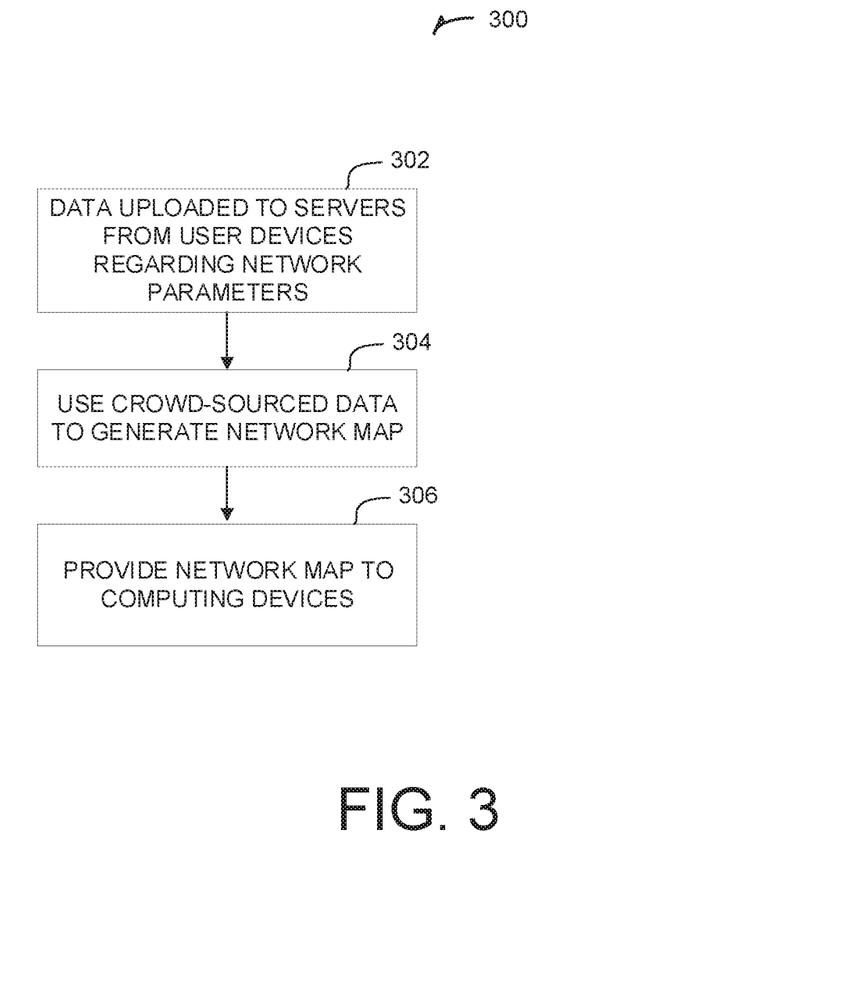
FIG. 3 is a flowchart illustrating a method of generating a network map using crowd-sourced data.

FIG. 3 is a flowchart illustrating a method 300 of generating a network map. The method 300 can be executed by the servers 102, a user device 104a-104f, or any other computer system. At step 302, user devices, such as phones, tablets, laptops, wearable devices, and other user devices, upload information regarding one or more parameters of a network for which a respective user device is connected. For example, a user device may be connected to a cellular network and using a cellular voice connection and/or a cellular data connection. In another example, the user device may be connected to a local area network or wide area network using any wireless protocol such as the IEEE 802.11 family of standards known as Wi-Fi®, 802.16 family of standards known as WiMax®, or any other network standard. In other examples, the device may be connected to another type of wireless network. In some examples, the user device may provide information regarding one or more parameters of networks and/or channels for which the respective user device is not connected. For example, service-set-identifiers (SSIDs) and signal strengths of nearby Wi-Fi® networks.

A respective user device may provide the device's geographical location, the cellular or other wireless network to which the device is wirelessly connected, the wireless channel through which the device is connected to the wireless network, a connection quality, and other parameters regarding the respective network. The device's location may be provided using geographic coordinates, such as latitude and longitude using the Global Positioning System (GPS), for example, an area descriptor, such as an intersection of two roads, or any other geographic data indicative of a device location. The connection quality may be a signal-to-noise ratio, an indication regarding successful connection, or any other indicator of connection quality. The user device may provide similar data regarding voice connection quality. In some examples, the device may provide a current navigational route the user device is travelling that was entered by the user.

At step 304, the collected data is used to generate a network map. The network map can take any form that allows mapping of network parameters for a wireless network to geographic locations. The network map data may be stored in one or more databases, for example, in any database storage format. Indicators may be generated using the uploaded user data, such as general network availability indicators for a geographical area. At step 306, a portion of, or the entire generated network map can be provided to other computing devices for use in planning network connections for a planned travel route, for example.

Figure 4:
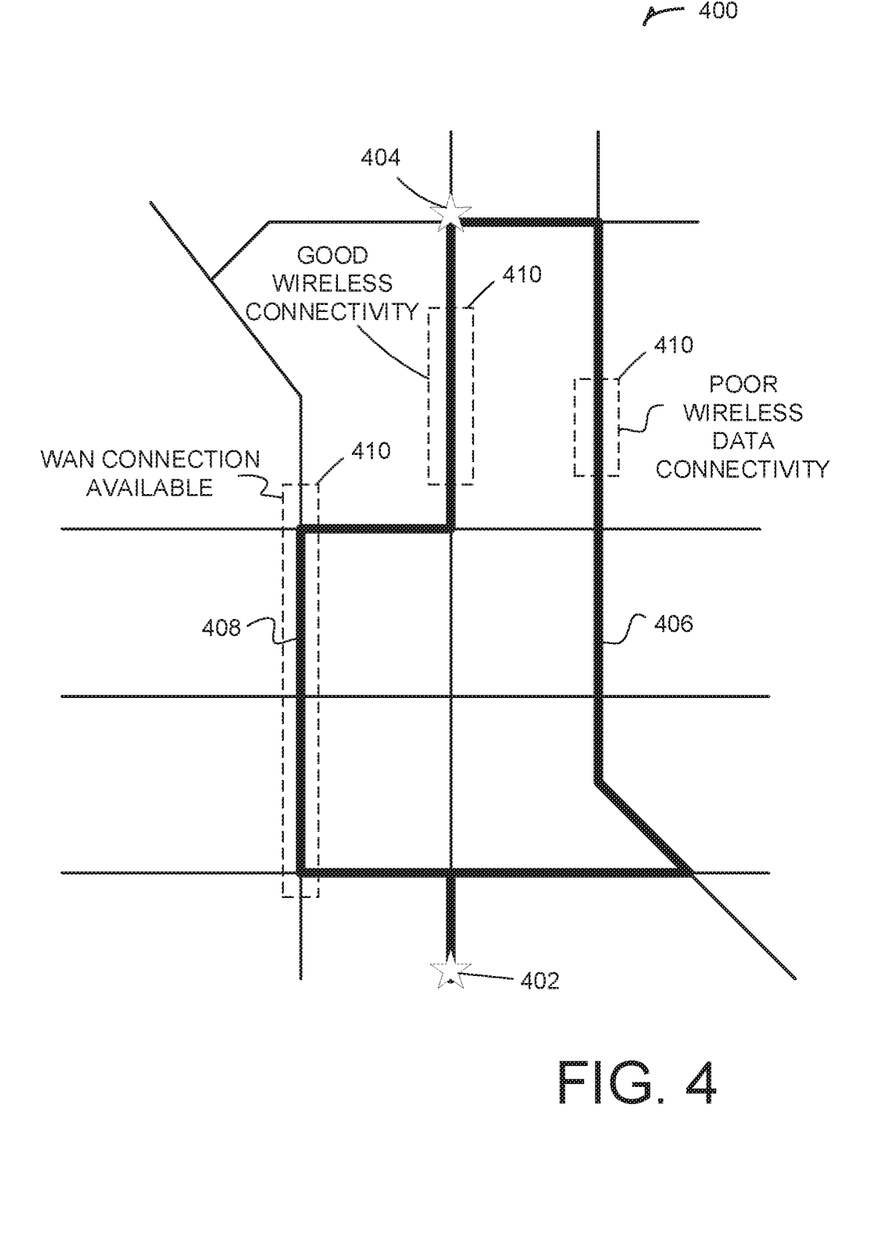
FIG. 4 is a client-side display illustrating a map that includes planned routes and data from a network map.

FIG. 4 is a diagram illustrating an example client-side display 400 for a user. The display 400 includes a map that illustrates a start location 402, an end location 404, a planned route 406, an alternate route 408, and network indicators 410. The network indicators 410 may provide indication to a user of one or more parameters of one or more wireless networks. For example, the indicators 412 can provide indication that a Wi-Fi® network is available, that no cellular voice connection is available, that no cellular data is available, that cellular data bandwidth is particularly high or low, or any other indication regarding any other network along the planned route 406 and/or the alternate route 408.

The display 400 may allow a user to better select between a planned route 406 and an alternate route 408 by knowing whether or not particular networks or network types are available for the entire trip. For example, if a user has an important voice call to take during the trip, the user may want to avoid any routes that indicate that cellular voice connections are particularly bad or unavailable for any specified portion of the route.

The display 400 may only include indicators 410 of particular importance to a user so-as not to overwhelm a user with data. For example, a user may not need to know the connection quality of every channel of every network along a planned route. Because of this, the display 400 may only include indicators 410 that provide indication such as network outages or other important indications regarding the planned routes. The client-side device may select these indicators using indications from the servers 102, user preferences, or any other basis for selecting indicators 410 for the display 400.

Figure 5:
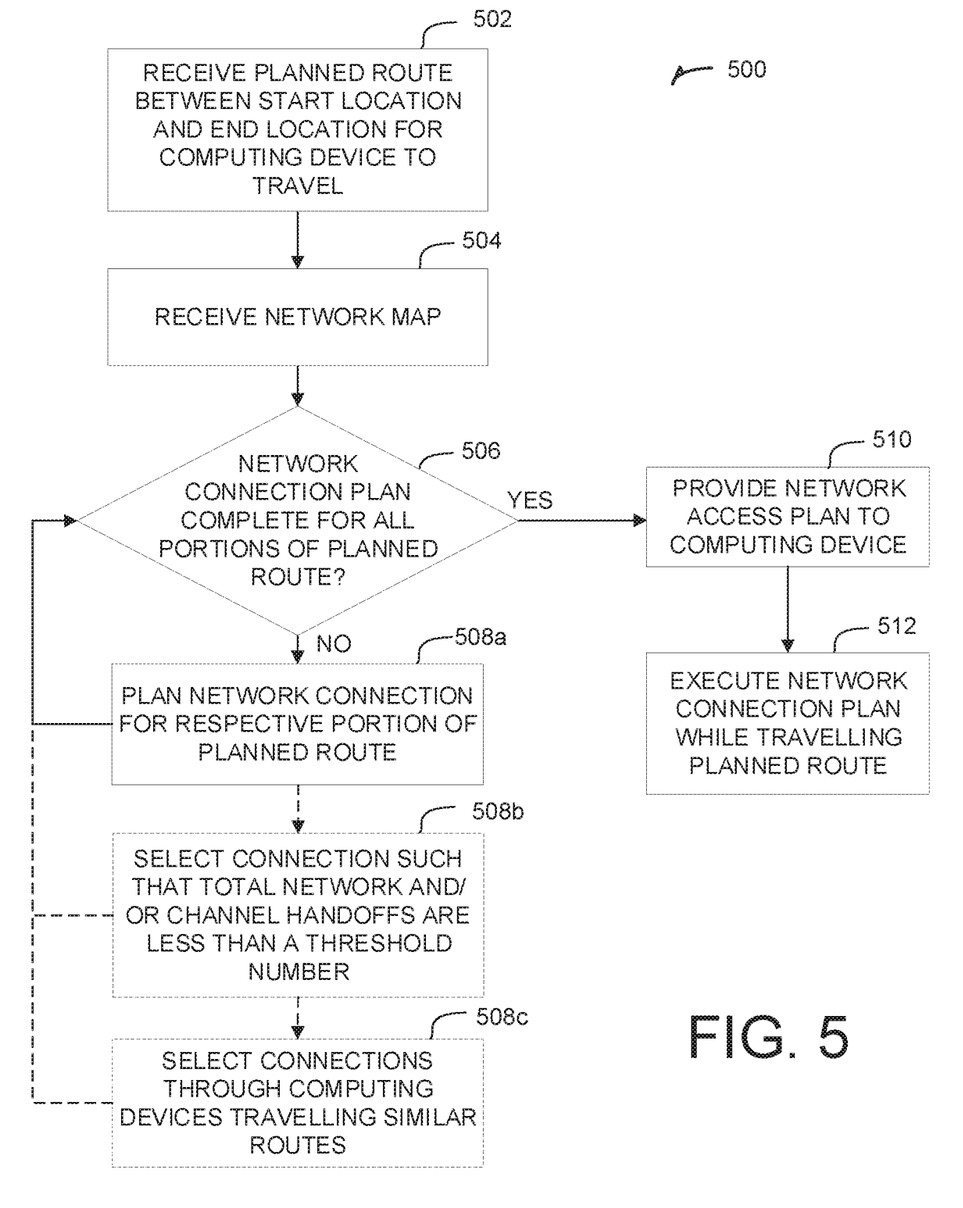
FIG. 5 is a flowchart illustrating a method of generating a network connection plan based on a planned travel route and a network map.

FIG. 5 is a flowchart illustrating a method 500 for planning network connections for a planned route using a network map. Similar to generating the display 400, the client-side device may begin with a planned route between a start location and an end location for a user. Planned routes may be generated using applications running on user devices, computing devices of automated vehicles, or other computing systems. The applications that generate these planned routes may also be configured to upload the planned routes to the servers for generation of the network map, or may send the planned routes to another separate application running on the same, or separate, computing device. For example, a network connection planning application may be loaded and run on a user or other computing device, and configured to receive a generated planned route from a separate route planning application.

At the time of execution of the method 500, a user may have already selected the route for which the user desires to travel. The method 500 can be executed by a server, such as the servers 102, or by a client-side computing device, such as the user devices 104*a*-104*f*, for example. The method 500 may be performed by one or more applications running on a respective user or other computing device. At step 502, a planned travel route is received. This planned route may be generated by an application executing on the client-side device, or may be received from one or more servers over a wired or wireless connection. At step 504, the network map is received. If method 500 is executed by a client-side computing device, the network map may be received from one or more servers over a wired or wireless network connection. If method 500 is executed by the server, the server may already have the network map as the server may have generated the network map, or the server may receive the network map from one or more other computing devices, such as another server.

The network map may include network parameters and/or indicators for both wireless networks and specific channels of the wireless networks. The planned route may be broken up into one or more portions. The portions can be any geographic size and may or may not be equal in distance. For example, the portions can be city blocks, one mile stretches of country highway, or any other geographic portion along the planned route. In some examples, the portions may be sized based on how the network map is stored. If the network map is generated and stored with data regarding city blocks, the portions may be sized as one or more city blocks. At steps 506 and 508*a*-508*c*, a network connection plan is generated for each portion of the planned route.

The network plan may include one or more planned connections to one or more networks through respective channels. When generating a network connection plan, the system may take several factors into consideration. For example, the indicators 208 (FIG. 2) may be used in conjunction with a computing device's planned activities to select a channel that is assigned to the computing device for a respective portion of the route. For example, a computing device that either indicates plans to, or is predicted to (through historical data, for example), primarily use VoIP, a channel with a lowest latency indicated by the network map for the respective portion of the route may be assigned. For example, the channel with the lowest latency score may be assigned. In another example, a computing device that is primarily used to stream data, such as music, may be assigned a channel with a greatest throughput as indicated by the network map for the respective portion of the route may be assigned.

In some examples, channels may be assigned for portions of a route based on the network map indicating a threshold performance. If a channel with a best indicated performance is always assigned for a respective geographic area, that channel may quickly become over-burdened. To avoid assigning the same channel for all computing devices traveling in a respective geographical area, a threshold performance may be used, and any channel that provides a connection better than the threshold may be assigned to a respective computing device. For example, for a computing device planning to use primarily VoIP, a latency threshold may be used. A random channel may be selected from all channels that the network map indicates as having a better latency than the threshold. This way, overuse of a single channel may be avoided.

In some examples, as illustrated by optional step 508*b*, the system may assign channels and/or networks for a network connection plan to minimize channel and/or network handoffs. Network and channel handoffs can result in network interruptions. This may be especially undesirable when performing latency sensitive tasks. By limiting or eliminating channel and/or network handoffs, these interruptions can be reduced or eliminated, improving a user experience, for example. To reduce handoffs, the system may select a network and/or channel for a portion of the route that may not have the best quality, but may reduce the total number of handoffs within the network connection plan. For example, a first wireless network may be selected for a first portion of the route. For the next portion, a second wireless network may be indicated to provide better connection quality, but the system may select to keep the computing device connected to the first wireless network, which may still have adequate connection quality, for the next portion to avoid interruptions caused by network handoffs.

In addition to wireless networks, planning the network connection plan may include connections through other computing devices travelling along similar routes, as illustrated by optional step 508*c*. For example, the system devising the network connection plan, such as one or more servers, may receive planned routes from many other computing devices. The network connection plan may include one or more connections through one or more of the other computing devices that are travelling along a similar route to the planned route. For example, another computing device may be accessing a WiFi® network during a portion of the route similar to a portion of the route of the respective computing device. The network connection plan can include a connection to the WiFi® network through the other computing device for the respective portion of the planned route. This may be desirable for computing devices that cannot by itself access a particular network, but is able to access the network through another computing device. This may be particularly advantageous when the particular network is indicated by the network map as having the highest quality for a respective geographical area.

At step 510, the network connection plan is provided to the computing device to execute while travelling the planned route. The network connection plan can come from one or more servers, or the device itself, for example. At step 512, the network connection plan is executed by the computing device while travelling the planned route.

Figure 6:
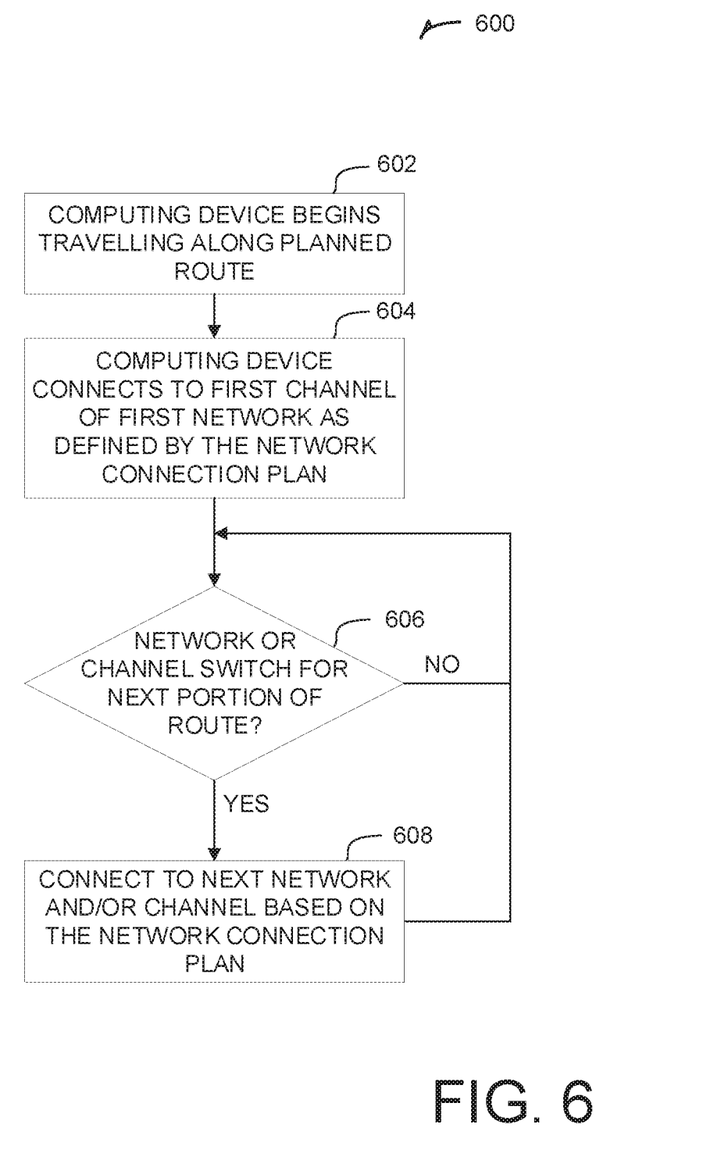
FIG. 6 is a flowchart illustrating a method of executing a network connection plan while travelling a planned route.

FIG. 6 is a flowchart illustrating a method 600 of executing a network connection plan while travelling a planned route. At step 602, a computing device begins travelling along the planned route. The computing device may be a user device travelling in a car, truck, train, motorcycle, or any other motor vehicle, for example. The computing device may also be an integrated device such as a computing device for an automated vehicle.

At step 604, the computing device connects to a first wireless network based on the network plan. For example, the network plan may define connection parameters specifying how to connect to respective networks of the wireless networks. This may include connecting to the first wireless network through a specific channel of the wireless network. For example, the computing device may connect to a base station of a cellular network through a specified channel. At step 606, it is determined if a change in network or channel is to occur. This can be determined on a portion-by-portion basis for the route, for example, using a current geographical position or location of the computing device. For example, GPS, cellular triangulation, or any other method of determining a location of the computing device may be used. If a current location of the computing device indicates that the computing device has transitioned to a new portion of the route and a change in connection to a network or channel is to occur, the method 600 proceeds to step 608. At step 608, the computing device connects to the next network and/or channel specified in the network connection plan. For example, the user may connect to the same base station of the same cellular network, but through a different wireless channel. The method 600 may continue for the entirety of travel of the computing device between the start location and the end location.

Figure 7:
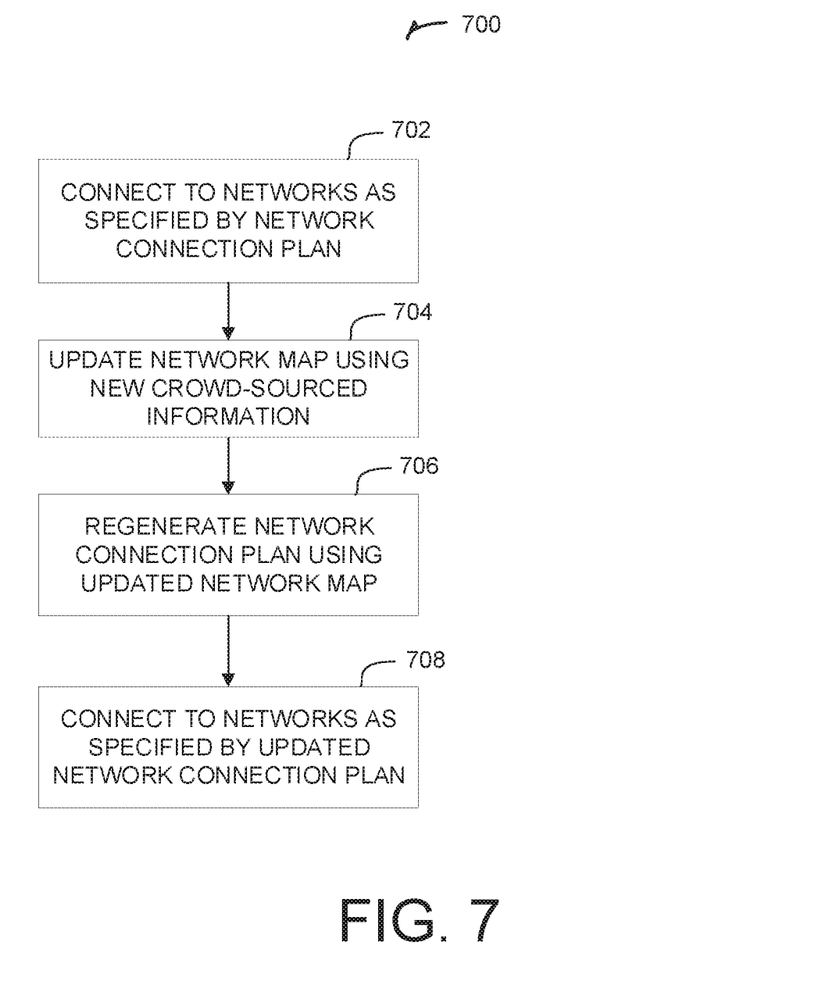
FIG. 7 is a flowchart illustrating a method of updating a network connection plan while travelling a planned route.

FIG. 7 is a flowchart illustrating a method 700 of updating a network plan while a computing device is travelling a planned route. At step 702, the computing device connects to networks as specified by a network connection plan for a planned route (using method 600, for example). At step 704, the network map is updated using new crowd-sourced data. For example, a user device may indicate that a particular network and/or channel has recently become unavailable for a portion of the planned route. At step 706, based on the updated network map, the network plan may be re-generated by the server or the computing device. For example, the network connection plan may be regenerated to connect to a newly specified channel of a wireless network upon the new network map indicating that the previously specified channel has been indicated as having poor quality or being unavailable. At step 708, the computing device connects to networks as specified in the updated network connection plan.

Figure 8:
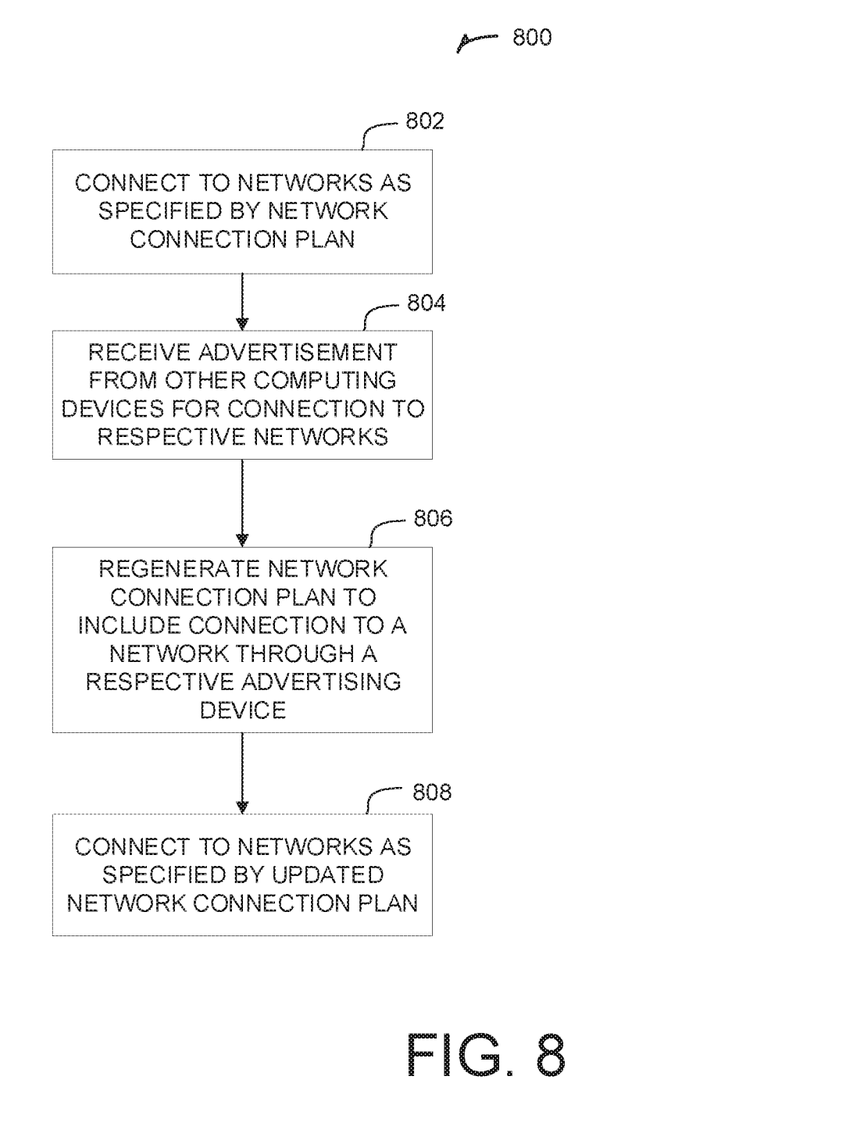
FIG. 8 is a flowchart illustrating a method of updating a network connection plan while travelling a planned route.

FIG. 8 is a flowchart illustrating a method 800 of updating a network plan while the computing device is travelling a planned route. Method 800 may be executed by a server or the client-side device and may be executed in conjunction with the method 700, for example. At step 802, the computing device connects to networks as specified by a network connection plan for a planned route (using method 600, for example). At step 804, while the computing device is travelling planned route, one or more computing devices travelling similar routes may advertise connectability through the respective devices to one or more networks. Connection through these devices may not have originally been taken into account when generating the network connection plan. If one or more of these connections improves a connection quality, the network connection plan may be updated to connect through one of the devices. At step 806, the network connection plan is updated to include connection to a network through a respective computing device that was advertising a network connection option. At step 808, the computing device connects to networks as specified in the updated network plan.

As described herein, the channels and/or wireless networks assigned to the user devices may be assigned based upon the suitability of the wireless resources for the intended wireless needs of the user devices. In some examples, the wireless needs may be determined based upon user input. In other examples, the wireless needs may be determined based upon a prediction of the wireless needs of the user device. In some examples, the prediction may be based upon a user's calendar. For example, if the calendar shows a VoIP call appointment, the system may infer that the user would like network resources that are optimal for VoIP calls. In other examples, the prediction may be based upon a machine-learned model that predicts the wireless needs of the user device based upon one or more features. Example features may include the time of day, day of the week, day of the year, the planned route, a calendar of the user (e.g., showing a VoIP meeting), a previous activity of the user (e.g., the wireless activity of the user prior to the route), and the like. Past feature data labelled with a wireless data usage type (e.g., VoIP, large file downloading, and the like) may be used to train the machine-learned model. Example machine-learning algorithms may include logistic regression, neural networks, decision forests, decision jungles, boosted decision trees, support vector machines, and the like. When determining a route, the current feature data of the user device may be applied to the model, and the model may make a prediction of the intended wireless needs of the device. The intended needs may be categories (e.g., low latency, high bandwidth, reliability above all else) that may then be matched to network segments based upon the network segment's scores for those categories. As noted, the scores may be based upon measurements of that category (e.g., latency measurements, bandwidth measurements, error rates, and the like) taken from a plurality of user devices. For example, the scores may be assigned via formulas that translate the network measurements into a score. An average score for all the devices may be utilized as the score for that particular segment.

Figure 9:
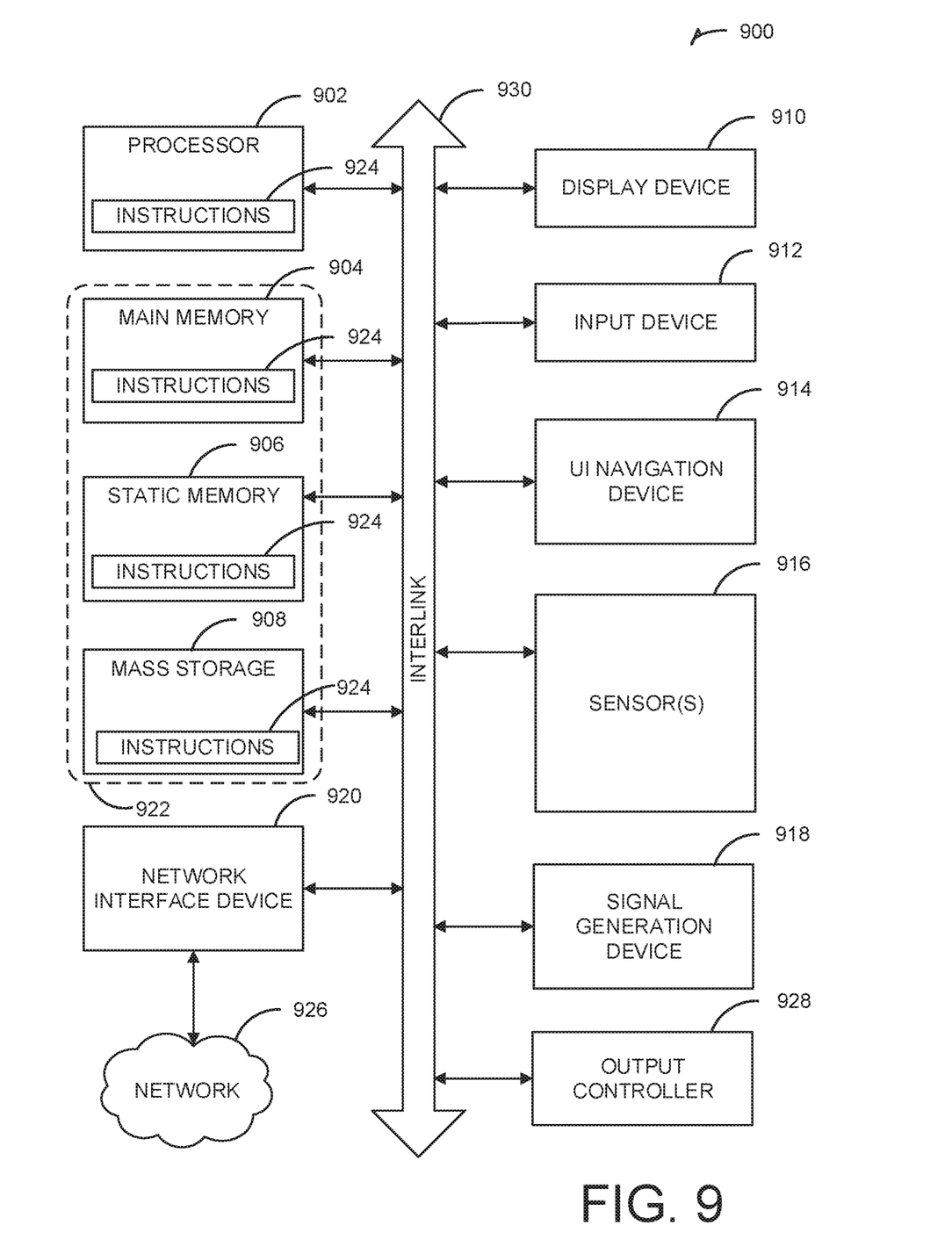
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. For example, the machine 900 can be any one or more of the servers 102 and/or user devices 104a-104f. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" play include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions, Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples," Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of planning network connectivity for a computing device, the method comprising:
   using one or more hardware processors:
   receiving a planned route for the computing device to physically travel along;
   accessing a quality map indicative of a plurality of network parameters for each of a plurality of wireless networks for a geographical area that includes at least a portion of the planned route, the plurality of network parameters including a connection quality value for a respective wireless network of the plurality of wireless networks indicating a connection quality for the respective wireless network;
   generating a network connection plan for the computing device prior to the computing device traveling along the planned route, the network connection plan comprising planned connections to selected networks of the plurality of wireless networks for each of a plurality of portions of the planned route based on parameter values indicated by the quality map for the selected networks of the plurality of wireless networks accessible along the planned route;
   while the computing device is physically travelling the planned route:
     determining a respective portion of the plurality of portions of the planned route based on a current location of the computing device;
     determining a respective network of the plurality of wireless networks based on the respective portion and the network connection plan; and
     responsive to determining the respective network, causing the computing device to connect to the respective network as specified by the network connection plan for the respective portion.

2. The method of claim 1, further comprising:
   receiving network quality data for the plurality of wireless networks from a plurality of user devices, the plurality of user devices different from the computing device;
   generating the quality map based on the network quality data from the plurality of user devices; and
   providing the network connection plan to the computing device.

3. The method of claim 1, wherein accessing the quality map comprises:
   requesting the quality map from at least one server location; and
   receiving at least a portion of the quality map from the at least one server location.

4. The method of claim 1, wherein the quality map comprises quality data for communication channels of each of the plurality of wireless networks, and wherein generating the network connection plan comprises:
   generating the network connection plan for the computing device so that a number of handoffs between respective communication channels of the one or more wireless networks is less than a threshold number.

5. The method of claim 1, further comprising:
   receiving a plurality of routes for a plurality of mobile devices through which the computing device can connect to one of the plurality of wireless networks; and
   determining which of the plurality of routes overlap with the planned route geographically and temporally; and wherein the planned connections to the wireless networks for each of the plurality of portions of the planned route comprise at least one connection through one or more of the plurality of mobile devices.

6. The method of claim 1, further comprising:
regenerating the quality map while the computing device is traveling along the planned route based on new data received from at least one of a plurality of mobile devices, the computing device not one of the plurality of mobile devices; and
updating the network connection plan using the regenerated quality map while the computing device is traveling along the planned route.

7. The method of claim 6, wherein a first mobile device of the plurality of mobile devices comprises at least one connectable device traveling on a common portion of the planned route and wherein the at least one connectable device broadcasts a connection ability.

8. The method of claim 1, wherein the plurality of wireless networks comprises a cellular network and one of a wireless local area network or a wireless wide area network.

9. The method of claim 1, wherein the network connection plan comprises planned connections to a plurality of channels of one of the one or more wireless networks.

10. The method of claim 1, wherein the network connection plan specifies, for each of the plurality of portions of the planned route, connection parameters specifying how to connect to respective networks of the plurality of wireless networks.

11. A system for planning network connectivity for a computing device, the system comprising:
one or more hardware processors;
a memory, storing instructions, which when executed, cause the one or more hardware processors to perform operations comprising:
receiving a planned route for the computing device to physically travel along;
accessing a quality map indicative of a plurality of network parameters for each of a plurality of wireless networks for a geographical area that includes at least a portion of the planned route, the plurality of network parameters including a connection quality value for a respective wireless network of the plurality of wireless networks indicating a connection quality for the respective wireless network;
generating a network connection plan for the computing device prior to the computing device traveling along the planned route, the network connection plan comprising planned connections to selected networks of the plurality of wireless networks for each of a plurality of portions of the planned route based on parameter values indicated by the quality map for the selected networks of the plurality of wireless networks accessible along the planned route;
while the computing device is physically travelling the planned route:
determining a respective portion of the plurality of portions of the planned route based on a current location of the computing device;
determining a respective network of the plurality of wireless networks based on the respective portion and the network connection plan; and
responsive to determining the respective network, causing the computing device to connect to the respective network as specified by the network connection plan for the respective portion.

12. The system of claim 11, wherein the operations of accessing the quality map comprise:
requesting the quality map from at least one server location; and
receiving at least a portion of the quality map from the at least one server location.

13. The system of claim 11, wherein the quality map comprises quality data for communication channels of each of the plurality of wireless networks, and wherein the operations of generating the network connection plan comprise:
generating the network connection plan for the computing device so that a number of handoffs between respective communication channels of the one or more wireless networks is less than a threshold number.

14. The system of claim 11, further comprising operations of:
receiving a plurality of routes for a plurality of mobile devices through which the computing device can connect to one of the plurality of wireless networks; and
determining which of the plurality of routes overlap with the planned route geographically and temporally; and
wherein the planned connections to the plurality of wireless networks for each of the plurality of portions of the planned route comprise at least one connection through one or more of the plurality of mobile devices.

15. The system of claim 11, further comprising operations of:
regenerating the quality map while the computing device is traveling along the planned route based on new data received from at least one of a plurality of mobile devices, the computing device not one of the plurality of mobile devices; and
updating the network connection plan using the regenerated quality map while the computing device is traveling along the planned route.

16. The system of claim 15, wherein a first mobile device of the plurality of mobile devices comprises at least one connectable device traveling on a common portion of the planned route and wherein the at least one connectable device broadcasts a connection ability.

17. The system of claim 11, wherein the plurality of wireless networks comprises a cellular network and one of a wireless local area network or a wireless wide area network.

18. The system of claim 11, wherein the network connection plan comprises planned connections to a plurality of channels of one of the one or more wireless networks.

19. The system of claim 11, wherein the network connection plan specifies, for each of the plurality of portions of the planned route, connection parameters specifying how to connect to respective networks of the plurality of wireless networks.

20. A computing device comprising:
means for receiving a planned route for the computing device to physically travel along;
means for accessing a quality map indicative of a plurality of network parameters for each of a plurality of wireless networks for a geographical area that includes at least a portion of the planned route, the plurality of network parameters including a connection quality value for a respective wireless network of the plurality of wireless networks indicating a connection quality for the respective wireless network;
means for generating a network connection plan for the computing device prior to the computing device traveling along the planned route, the network connection plan comprising planned connections to selected networks of the plurality of wireless networks for each of a plurality of portions of the planned route based on parameter values indicated by the quality map for the selected networks of the plurality of wireless networks accessible along the planned route;

while the computing device is physically travelling the planned route:
- means for determining a respective portion of the plurality of portions of the planned route based on a current location of the computing device;
- means for determining a respective network of the plurality of wireless networks based on the respective portion and the network connection plan; and
- means for, responsive to determining the respective network, causing the computing device to connect to the respective network as specified by the network connection plan for the respective portion.

\* \* \* \* \*